United States Patent
Chao et al.

(10) Patent No.: US 11,106,529 B1
(45) Date of Patent: Aug. 31, 2021

(54) POST PACKAGE REPAIR FAILURE MEMORY LOCATION REPORTING SYSTEM

(71) Applicant: Dell Products L.P., Round Rock, TX (US)

(72) Inventors: Ching-Lung Chao, Austin, TX (US); Shih-Hao Wang, Taipei (TW); Hung-Tah Wei, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/935,365

(22) Filed: Jul. 22, 2020

(51) Int. Cl.
  *G06F 11/00* (2006.01)
  *G06F 11/07* (2006.01)

(52) U.S. Cl.
  CPC ...... *G06F 11/0793* (2013.01); *G06F 11/0727* (2013.01); *G06F 11/0751* (2013.01)

(58) Field of Classification Search
  CPC ............. G06F 11/1008; G06F 11/1064; G06F 11/1068; G06F 11/1072; G06F 11/1402; G06F 11/1446; G06F 11/1448; G06F 11/1458; G06F 11/1088; G06F 11/1096; G06F 11/16; G06F 11/1612; G06F 11/1658; G06F 11/1666; G06F 11/20; G06F 11/2094; G06F 11/0727; G06F 11/073; G06F 11/2053
  USPC ....................................................... 714/1–57
  See application file for complete search history.

(56) References Cited

U.S. PATENT DOCUMENTS

| | | | | |
|---|---|---|---|---|
| 2003/0056141 A1* | 3/2003 | Lai | ......................... | G11C 16/06 714/6.12 |
| 2008/0270675 A1* | 10/2008 | Nagaraj | ............... | G06F 12/0246 711/100 |
| 2009/0138754 A1* | 5/2009 | Edwards | ............. | G06F 11/1068 714/6.11 |
| 2009/0144583 A1* | 6/2009 | Bruennert | .............. | G11C 29/44 714/6.32 |
| 2014/0089726 A1* | 3/2014 | Warnes | ............... | G06F 11/1008 714/6.1 |

(Continued)

OTHER PUBLICATIONS

Chen, Chih-Chung, "Unavailable Memory Device Initialization System," U.S. Appl. No. 16/789,994, filed Feb. 13, 2020, Specification 25 pages, Drawings 9 pages.

*Primary Examiner* — Sarai E Butler
(74) *Attorney, Agent, or Firm* — Haynes and Boone, LLP

(57) ABSTRACT

A PPR memory location reporting system includes BIOS coupled to a non-volatile memory system and a volatile memory system. During boot operations, the BIOS identifies a memory location identifier in the non-volatile memory system for a memory location that is included in the volatile memory system and that is associated with PPR, performs PPR operations on the memory location, and determines that the PPR operations on the memory location have failed. In response to determining that the PPR operations on the memory location have failed, the BIOS stores the memory location identifier in a boot error report table that is configured for use by an operating system to prevent use of the memory location by the operating system, and reserves the memory location identifier in a memory map that is configured for use by the operating system to prevent use of the memory location by the operating system.

20 Claims, 13 Drawing Sheets

(56) References Cited

U.S. PATENT DOCUMENTS

| | | | | |
|---|---|---|---|---|
| 2014/0215264 | A1* | 7/2014 | Ono | G06F 11/0757 |
| | | | | 714/13 |
| 2017/0308447 | A1* | 10/2017 | Wu | G11C 29/835 |
| 2020/0142824 | A1* | 5/2020 | Koladi | G06F 12/0284 |
| 2020/0379843 | A1* | 12/2020 | Chao | G06F 21/575 |

* cited by examiner

POST PACKAGE REPAIR FAILURE MEMORY LOCATION REPORTING SYSTEM

BACKGROUND

The present disclosure relates generally to information handling systems, and more particularly to reporting memory locations in an information handling system for which Post Package Repair (PPR) has failed.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as server computing devices, desktop computing devices, laptop/notebook computing devices, tablet computing devices, mobile phones, and/or other computing devices known in the art, sometimes experience memory system issues that result in unavailable memory locations in their memory system. For example, volatile memory devices such as Dual Data Rate (DDR) Dual Inline Memory Modules (DIMMs) include Dynamic Random Access Memory (DRAM) that can fail, "go bad", and/or otherwise become unavailable such that a corresponding memory location (e.g., a memory row) provided by that DRAM in the DIMMs becomes unavailable as well. Unavailable memory locations provided by a DRAM can be remedied using Post Package Repair (PPR), which operates to replace the unavailable memory location in the memory system provided by the DRAM with an available memory location provided in a DRAM in the DIMMs that is reserved for PPR operations. However, conventional memory systems typically include between 10-20 reserved memory locations (e.g., reserved memory rows), and once all of those reserved memory locations have been used to replace unavailable memory locations, subsequent PPR operations for subsequently unavailable memory locations will fail, resulting in the memory system operating with the unavailable memory location. As will be appreciated by one of skill in the art in possession of the present disclosure, operation of the memory system with the unavailable memory location can result in memory errors if the unavailable memory location is accessed (e.g., by the operating system in the computing device).

Accordingly, it would be desirable to provide a Post Package Repair (PPR) failure memory location reporting system that addresses the issues discussed above.

SUMMARY

According to one embodiment, an Information Handling System (IHS) includes a Basic Input/Output System (BIOS) processing system; and a BIOS memory system that is coupled to the BIOS processing system and that includes instructions that, when executed by the BIOS processing system, cause the BIOS processing system to provide a BIOS engine that is configured, during boot operations, to: identify, in a non-volatile memory system, a memory location identifier for a memory location that is included in a volatile memory system and that is associated with Post Package Repair (PPR); perform, in response to identifying that the memory location identifier is associated with PPR, PPR operations on the memory location; determine that the PPR operations on the memory location have failed; store, in a boot error report table in response to determining that the PPR operations on the memory location have failed, the memory location identifier, wherein the boot error report table is configured for use by an operating system to prevent use of the memory location by the operating system; and reserve, in a memory map in response to determining that the PPR operations on the memory location have failed, the memory location identifier, wherein the memory map is configured for use by the operating system to prevent use of the memory location by the operating system.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
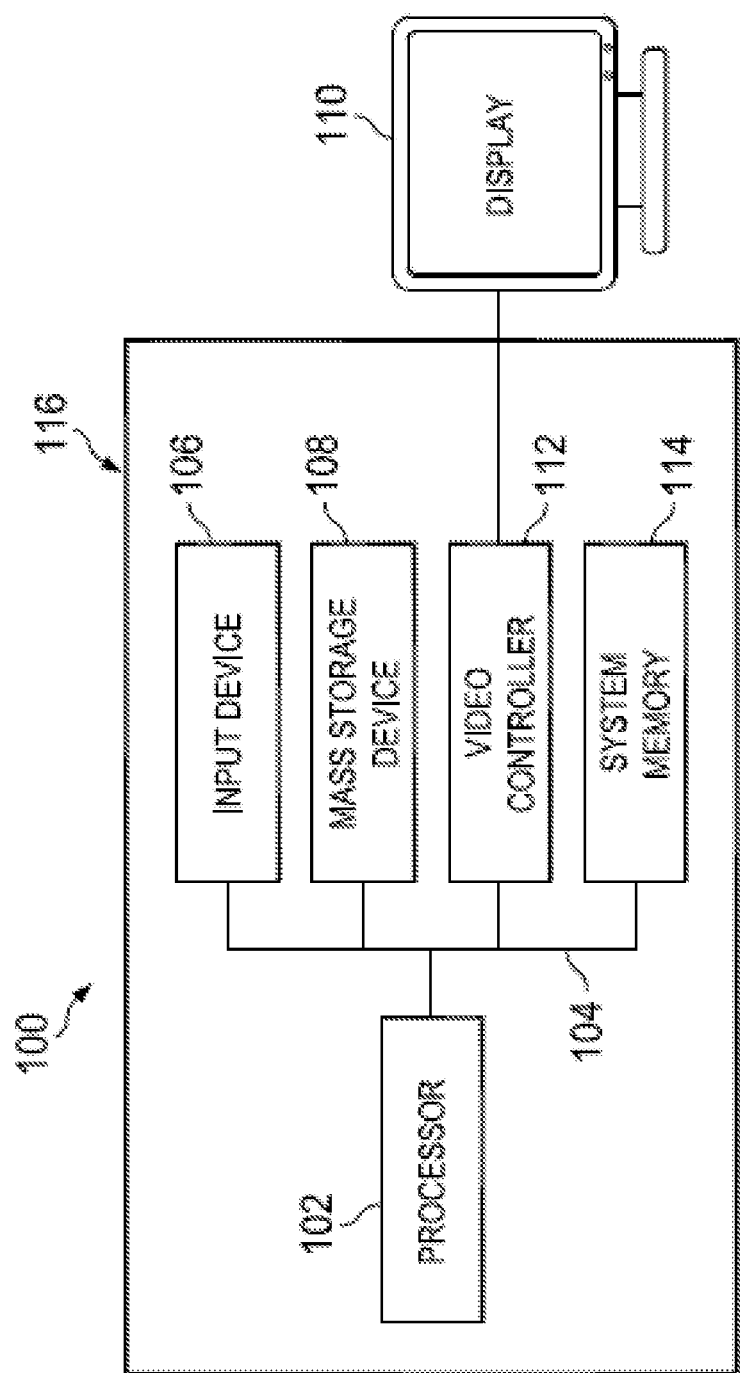
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
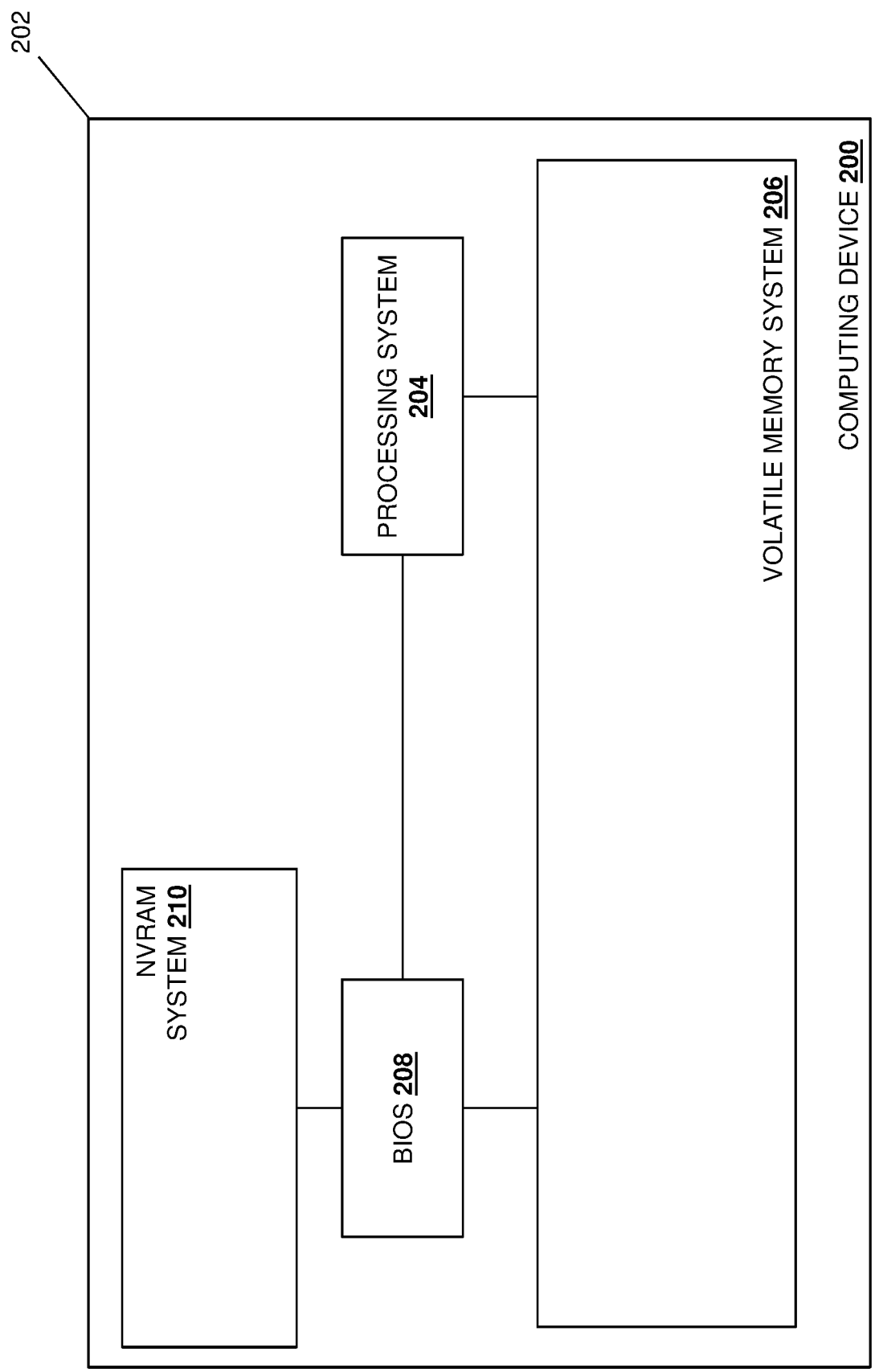
FIG. 2 is a schematic view illustrating an embodiment of a computing device that may utilize the Post Package Repair (PPR) failure memory location reporting system of the present disclosure.

Referring now to FIG. 2, an embodiment of a computing device 200 is illustrated that may utilize the PPR failure memory location reporting system of the present disclosure. In an embodiment, the computing device 200 may be provided by the IHS 100 discussed above with reference to FIG. 1 and/or may include some or all of the components of the IHS 100, and in specific examples may be provided by a server computing device, a desktop computing device, a laptop/notebook computing device, a tablet computing device, a mobile phone, and/or any other computing device that would be apparent to one of skill in the art in possession of the present disclosure. Furthermore, while illustrated and discussed as being provided by particular computing devices, one of skill in the art in possession of the present disclosure will recognize that the functionality of the computing device 200 discussed below may be provided by other devices that are configured to operate similarly as the computing device 200 discussed below. In the illustrated embodiment, the computing device 200 includes a chassis 202 that houses the components of the computing device 200, only some of which are illustrated below.

For example, in the illustrated embodiment, the chassis 202 houses a processing system 204 (e.g., which may include one or more of the processor 102 discussed above with reference to FIG. 1 that provide a primary processing system or Central Processing Unit (CPU) for the computing device 200) and a volatile memory system 206 (e.g., which may include the memory 114 discussed above with reference to FIG. 1) that is coupled to the processing system 204 and that includes instructions that, when executed by the processing system 204, cause the processing system 204 to provide an operating system engine that is configured to provide the operating system discussed below, as well as to provide a variety of other computing device functionality that would be apparent to one of skill in the art in possession of the present disclosure. As discussed below, in some examples the volatile memory system 206 may be provided by Dual Data Rate (DDR) Dual Inline Memory Modules (DIMMs) including Dynamic Random Access Memory (DRAM) devices, although other memory modules including other volatile memory devices will fall within the scope of the present disclosure as well. Furthermore, the volatile memory system 206 may also store a boot error report table and a memory map utilized by the PPR failure memory location reporting system of the present disclosure, also discussed in further detail below.

As illustrated, the chassis 202 may also house a Basic Input/Output System (BIOS 208 that is coupled to the processing system 204 and the non-volatile memory system 206. As will be appreciated by one of skill in the art in possession of the present disclosure, the BIOS 208 may be provided by firmware and may be used to perform hardware initialization during booting operations (e.g., Power-On StartUp (POST)) for the computing device 200, as well as provide runtime services for an operating systems and/or other applications/programs provided by the computing device 200. As such, the BIOS 208 may be provided by a BIOS processing system (not illustrated, but which may include the processor 102 discussed above with reference to FIG. 1) and a BIOS memory system (not illustrated, but which may be provided by the memory 114 discussed above with reference to FIG. 1) that includes instruction that, when executed by the BIOS processing system, cause the BIOS processing system to provide a BIOS engine that is configured to performs the operations of the BIOS 210 discussed below. Furthermore, while discussed as being provide by a BIOS, one of skill in the art in possession of the present disclosure will recognize that the BIOS 210 may be provided according to the Unified Extensible Firmware Interface (UEFI) specification, which defines a software interface between operating systems and platform firmware and which was provided to replace legacy BIOS firmware, while remaining within the scope of the present disclosure as well.

The chassis 302 may also house a non-volatile memory system such as the Non-Volatile Random Access Memory (NVRAM) system 210 that is illustrated in FIG. 2 and that is coupled to the BIOS 208. However, while a specific computing device 200 has been illustrated, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the functionality discussed below, while remaining within the scope of the present disclosure as well.

Figure 3:
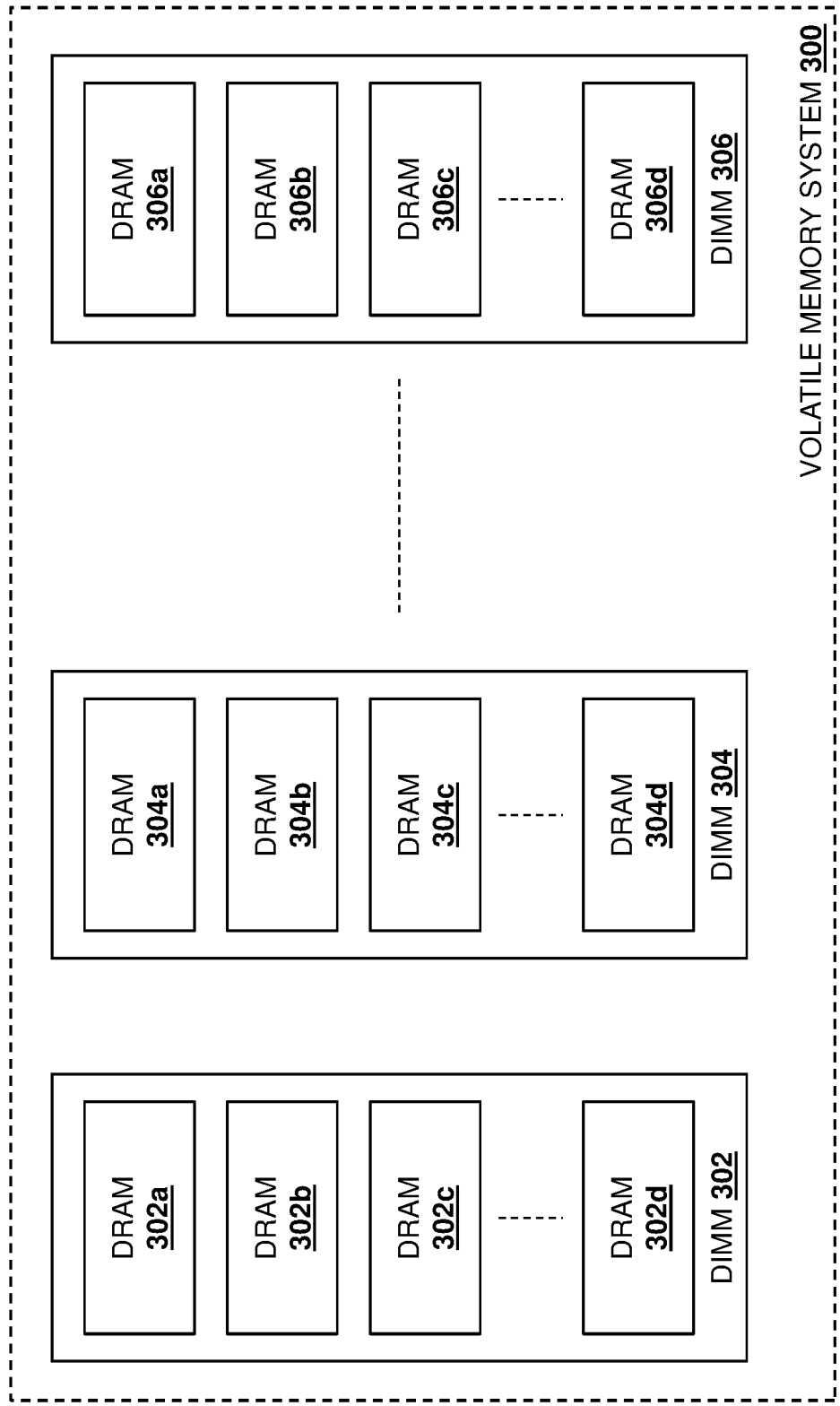
FIG. 3 is a schematic view illustrating an embodiment of a volatile memory system that may be include in the computing device of FIG. 2.

Referring now to FIG. 3, an embodiment of a volatile memory system 300 is illustrated that may provide the volatile memory system 206 discussed above with reference to FIG. 2. As illustrated, the volatile memory system 300 may include a plurality of Dual Inline Memory Modules (DIMMs) 302, 304, and up to 306, with the DIMM 302 including a plurality of Dynamic Random Access Memory (DRAM) devices 302*a*, 302*b*, 302*c*, and up to 302*d*; the DIMM 304 including a plurality of DRAM devices 304*a*, 304*b*, 304*c*, and up to 304*d*; and the DIMM 306 including a plurality of DRAM devices 306*a*, 306*b*, 306*c*, and up to 306*d*. However, while a particular volatile memory system is illustrated and discussed below, one of skill in the art in possession of the present disclosure will appreciate that other volatile memory systems including other memory modules having other volatile memory devices that may experience unavailable memory locations will fall within the scope of the present disclosure as well.

Figure 4:
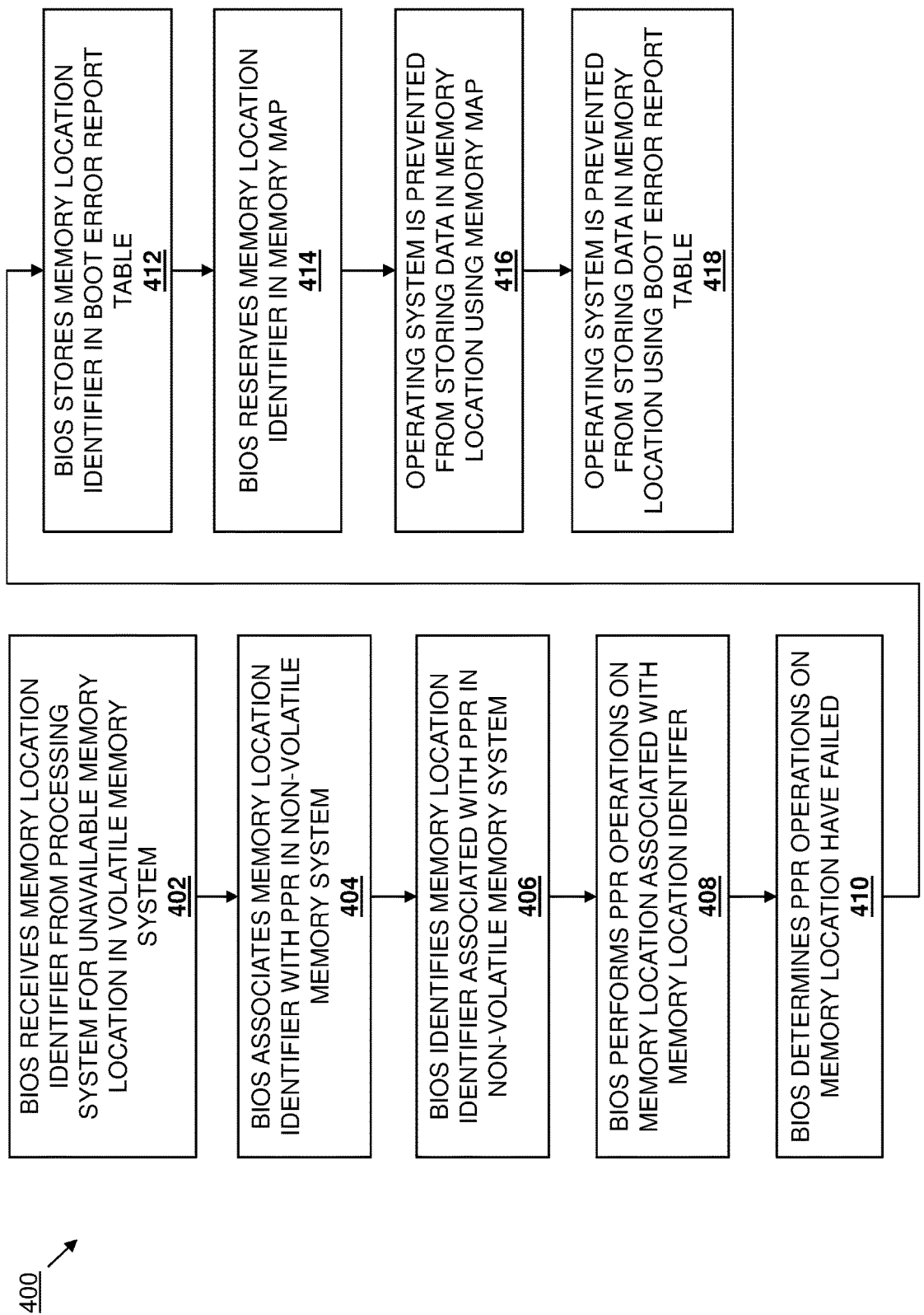
FIG. 4 is a flow chart illustrating an embodiment of a method for reporting PPR failure memory locations.

Referring now to FIG. 4, an embodiment of a method 400 for reporting PPR failure memory locations is illustrated. As discussed below, the systems and methods of the present disclosure provide for the reporting of memory locations associated with a Post Packet Repair (PPR) failure in a boot error report table and a memory map such that an operating system is prevented from storing data in those memory locations associated with the PPR failure. For example, the PPR memory location reporting system of the present disclosure may include a BIOS that is coupled to a non-volatile memory system and a volatile memory system, with the BIOS operating to identify a memory location identifier in the non-volatile memory system for a memory location that is included in the volatile memory system and that is associated with PPR and, in response, perform PPR operations on the memory location. In the event the BIOS determines that the PPR operations on the memory location have failed, the BIOS stores the memory location identifier in a boot error report table that prevents use of the memory location by the operating system, and reserves the memory location identifier in a memory map that also prevents use of the memory location by the operating system. As such, unavailable memory locations that cannot be repaired via PPR will not be utilized by the operating system to store data, thus reducing the memory errors experienced in a memory system that has exhausted its PPR resources.

Figure 5A:
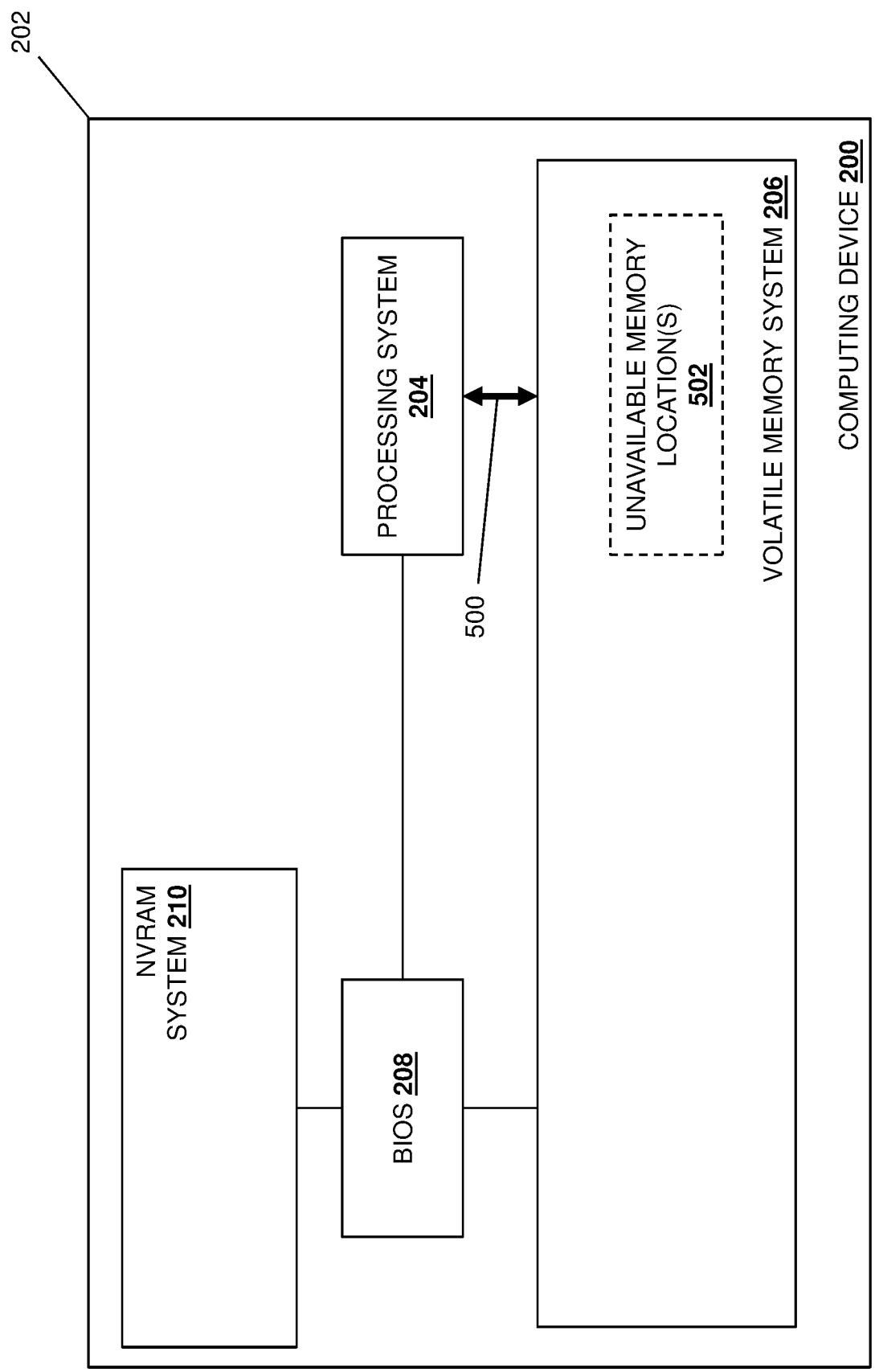
FIG. 5A is a schematic view illustrating an embodiment of the computing device of FIG. 2 operating during the method of FIG. 4.

The method 400 begins at block 402 where a BIOS receives a memory location identifier from a processing system for an unavailable memory location in a volatile memory system. With reference to FIG. 5A, in an embodiment of block 402 and during first runtime operations for the computing device 200, the processing system 204 may perform memory location access operations 500 in the volatile memory system 206 that, in the illustrated example, includes one or more unavailable memory locations 502 (e.g., memory errors and/or other unavailable memory locations known in the art). As will be appreciated by one of skill in the art in possession of the present disclosure, memory location(s) provided by any of the DRAM 302*a*-302*d*, 304*a*-304*d*, and 306*a*-306*d* in the DIMMs 302-306 may fail, "go bad", include errors, and/or otherwise become unavailable in order to provide the unavailable memory location(s) 502 at block 402. In the examples below, the unavailable memory location(s) 502 are described below as being provided by an unavailable row in a DRAM (e.g., a row in the DRAM with errors), but one of skill in the art in possession of the present disclosure will recognize that the unavailable memory location(s) 502 may be described by a rank, row, column, bank, DRAM, and/or other unavailable memory location descriptors that operate to identify DRAMs, a DRAM, or portion of a DRAM that have become unavailable. As such, at block 402, the memory location access operations 500 may result in the processing system 204 identifying the unavailable memory location(s) 502 (e.g., memory errors) that are described below as being provided by a row in the DRAM 302*a* included in the DIMM 302, but one of skill in the art in possession of the present disclosure will recognize that the identification of any unavailable memory location(s) known in the art will fall within the scope of the present disclosure as well.

Figure 5B:
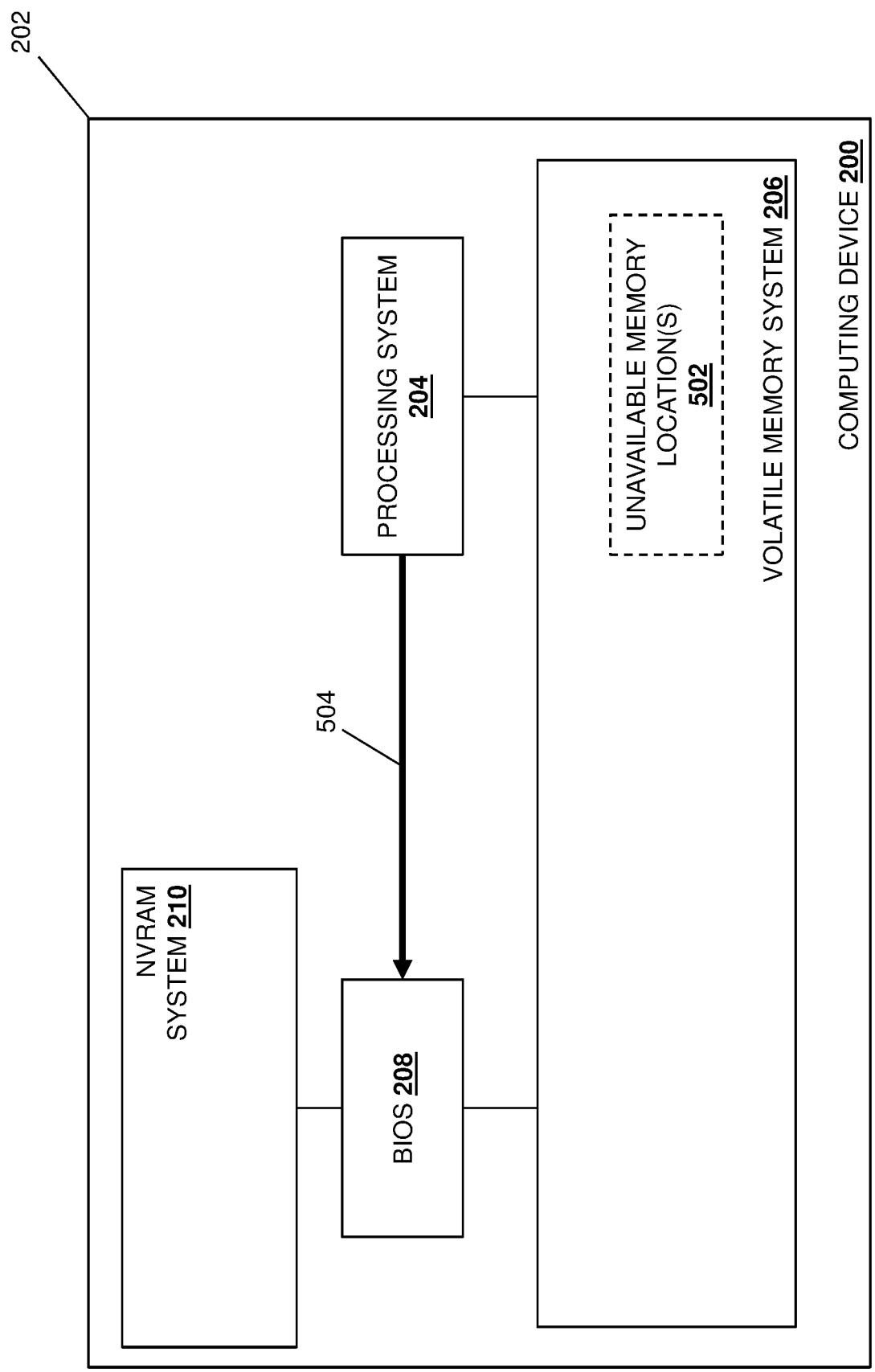
FIG. 5B is a schematic view illustrating an embodiment of the computing device of FIG. 2 operating during the method of FIG. 4.

As illustrated in FIG. 5B, in response to identifying the unavailable memory location(s) 502 in the volatile memory system 206, the processing system 204 may perform unavailable memory location reporting operations 504 in order to report the unavailable memory location(s) 502 to the BIOS 208. For example, in response to identifying the unavailable memory location(s) 502 in the volatile memory system 206 during the first runtime operations for the computing device 200, the processing system 204 may perform System Management Interrupt (SMI) operations that one of skill in the art in possession of the present disclosure will recognize may include suspending normal execution of the processing system 204 in order to provide memory location identifier(s) for the unavailable memory location(s) 502 to the BIOS 208. However, while a specific unavailable memory location reporting technique is described, one of skill in the art in possession of the present disclosure will recognize that the unavailable memory location(s) 502 may be reported to the BIOS 208 in a variety of manners that will fall within the scope of the present disclosure as well. As such, at block 402, the BIOS 208 receives memory location identifier(s) that are associated with the unavailable memory location(s) 502, and that may include a rank identifier, row identifier, column identifier, bank identifier, DRAM identifier, and/or other unavailable memory location descriptors that one of skill in the art in possession of the present disclosure will recognize describes unavailable memory locations in a volatile memory system (e.g., in a DRAM included in a DIMM that provides a volatile memory system.)

Figure 5C:
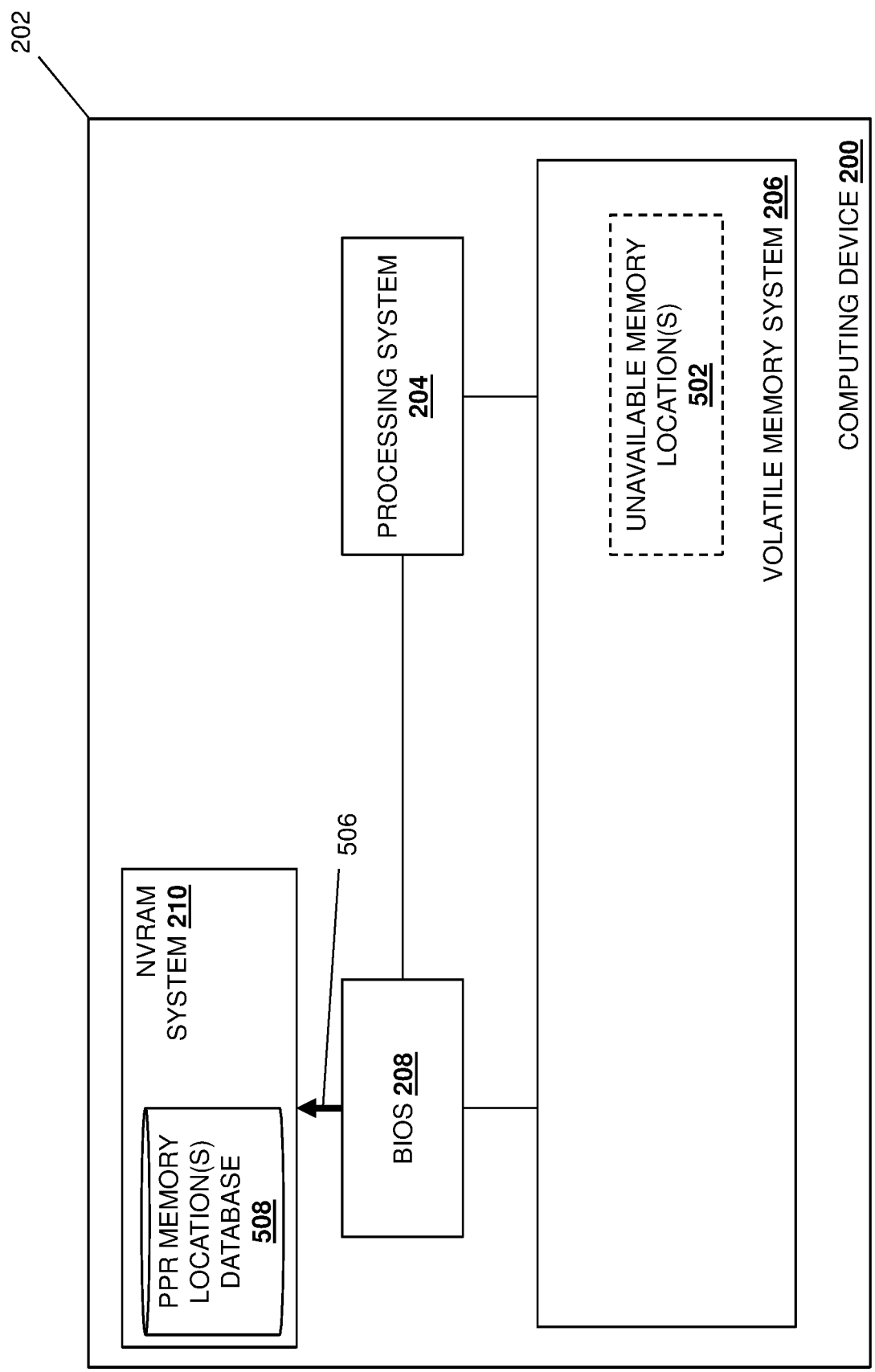
FIG. 5C is a schematic view illustrating an embodiment of the computing device of FIG. 2 operating during the method of FIG. 4.

The method 400 then proceeds to block 404 where the BIOS associates the memory location identifier with PPR in a non-volatile memory system. With reference to FIG. 5C, in an embodiment of block 404 and during the first runtime operations for the computing device 200, the BIOS 208 may perform PPR memory location identification operations 506 that may include storing the memory location identifier(s) for the unavailable memory location(s) 502 received at block 402 in a PPR memory location(s) database 508 that is included in the NVRAM system 210. As will be appreciated by one of skill in the art in possession of the present disclosure and as discussed in further detail below, the PPR memory location(s) database 508 may be configured to store memory location identifier(s) for unavailable memory location(s) for the purposes of performing PPR operations during subsequent boot operations of the computing device 200, and thus may include any PPR data structure known in the art for identifying memory locations upon which PPR should be performed. As such, while the memory location identifier(s) for the unavailable memory location(s) 502 are described as being associated with PPR via their storage in the PPR memory location(s) database 508, one of skill in the art in possession of the present disclosure will recognize that unavailable memory locations may be associated with PPR in a variety of manners that will fall within the scope of the present disclosure as well.

Figure 5D:
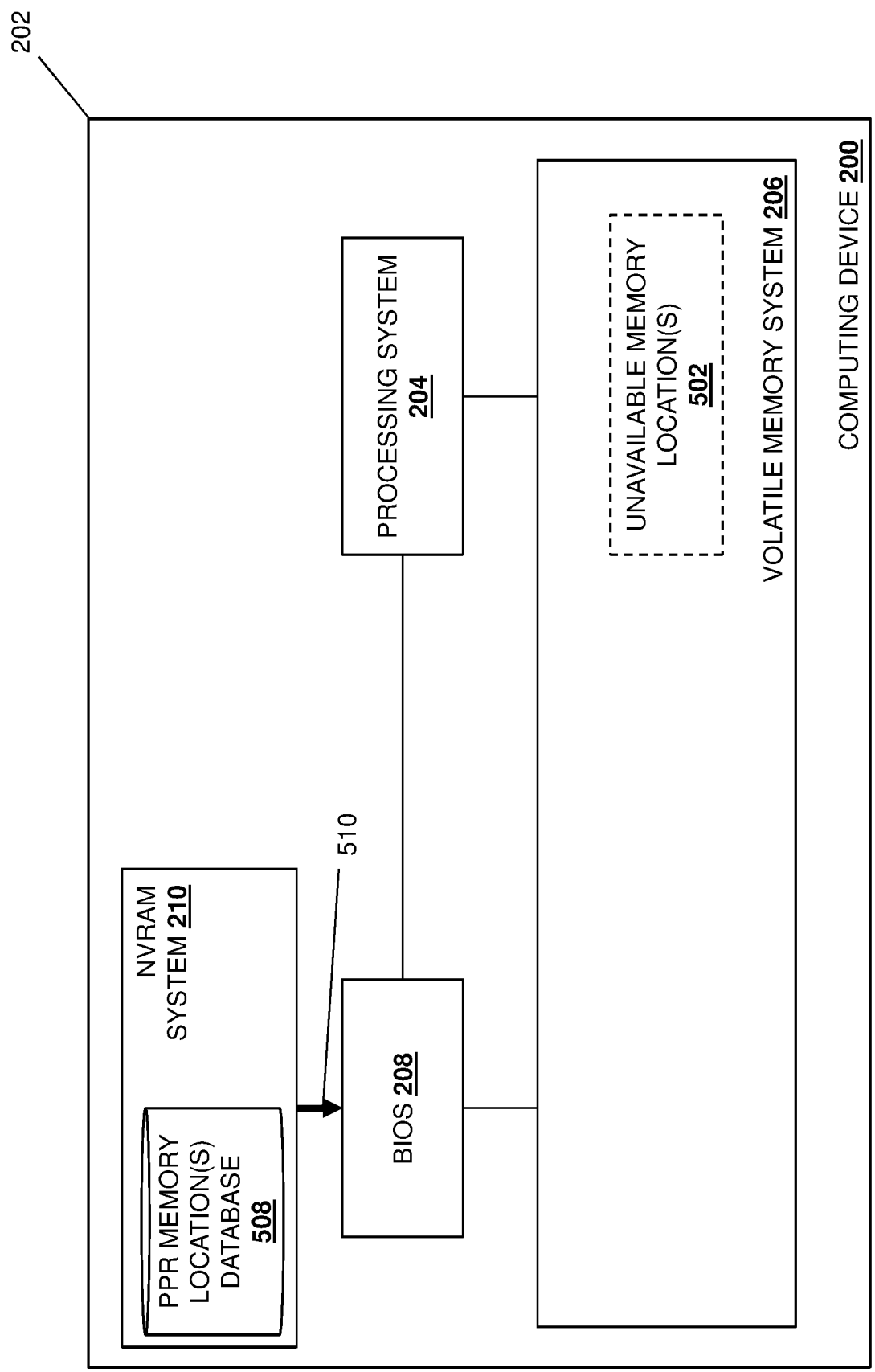
FIG. 5D is a schematic view illustrating an embodiment of the computing device of FIG. 2 operating during the method of FIG. 4.

The method 400 then proceeds to block 406 where the BIOS identifies the memory location identifier associated with PPR in the non-volatile memory system. With reference to FIG. 5D, in an embodiment of block 406 and during boot operations for the computing device 200 that follow the first runtime operations for the computing device 200, the BIOS 208 may perform PPR memory location retrieval operations 510 that include retrieving the memory location identifier(s) for the unavailable memory location(s) 502 in the volatile memory system 206 from the PPR memory location(s) database 508 in the NVRAM system 210. For example, the first runtime operations for the computing device 200 discussed above may end in response to the powering off/powering on, reset, and/or other initialization of the computing device 200, which one of skill in the art in possession of the present disclosure will recognize will cause the computing device 200 to begin boot operations using the BIOS 208. As part of those boot operations for the computing device 200, the BIOS 208 may retrieve, from the PPR memory location(s) database 508 in the NVRAM system 210, the memory location identifier(s) for the unavailable memory location(s) 502 in the volatile memory system 206 for the purposes of performing PPR operations that one of skill in the art in possession of the present disclosure will recognize are performed to attempt to repair those unavailable memory location(s) 502 in the volatile memory system 206.

In a specific example, the memory location identifier(s) for the unavailable memory location(s) 502 in the volatile memory system 206 may include a DIMM serial number for a "bad" or otherwise unavailable DIMM and, at block 406, the BIOS engine in the BIOS 208 may operate to compare the DIMM serial number for the "bad" or otherwise unavailable DIMM to each DIMM in the volatile memory system 206 to determine whether there is a match (i.e., whether the "bad" or otherwise unavailable DIMM identified in the NVRAM system 210 matches a DIMM in the volatile memory system 206). However, while the retrieval of the memory location identifier(s) for the unavailable memory location(s) 502 in the volatile memory system 206 is discussed as being performed at a particular time and in a particular manner, one of skill in the art in possession of the present disclosure will recognize that the retrieval of memory location identifier(s) for unavailable memory location(s) in a volatile memory system may be performed at other times that will fall within the scope of the present disclosure as well.

The method 400 then proceeds to block 408 where the BIOS performs PPR operations on the memory location associated with the memory location identifier. In an embodiment, at block 408 and during the boot operations for the computing device 200 that follow the first runtime operations for the computing device 200, the BIOS 208 may operate to perform PPR operations on the unavailable memory location(s) 502 identified by the unavailable memory location identifier(s) that were retrieved from the PPR memory location(s) database 508 in the NVRAM system 210 at block 406. As will be appreciated by one of skill in the art in possession of the present disclosure, PPR operations on the unavailable memory location(s) 502 at block 408 may include attempting to "replace" each unavailable memory location (e.g., an unavailable row in the DRAM 302a included in the DIMM 302) with a reserved memory location (e.g., a reserved row in the DRAM 302d included in the DIMM 302) by, for example, removing a corresponding memory location identifier for the unavailable memory location (e.g., a row identifier for the unavailable row in the DRAM 302a included in the DIMM 302) from a PPR table (not illustrated), and replacing it with a corresponding memory location identifier for the reserved memory location (e.g., a row identifier for the reserved row in the DRAM 302d included in the DIMM 302) in the PPR table (not illustrated). As such, for each of the unavailable memory location(s) 502 in the volatile memory system 206, the BIOS 208 may operate at block 408 to attempt to replace that unavailable memory location with a reserved memory location.

As discussed above, the number of reserved memory locations in the volatile memory system 206 may be limited, and conventional volatile memory systems typically include 10-20 reserved memory locations (e.g., reserved memory rows) for use in PPR operations to replace unavailable memory locations. As such, some embodiments of the method 400 may include the BIOS 208 performing the PPR operations at block 408 to replace at least some of the unavailable memory location(s) 502 with reserved memory locations, thus repairing the volatile memory system 206 (e.g., the DRAM 302a included in the DIMM 302 that provides the volatile memory system 206) and allowing the use of the volatile memory system 206 without experiencing memory system errors (e.g., because the unavailable row in the DRAM 302a included in the DIMM 302 has been replaced with a reserved row in the DRAM 302d that is available/operational/accessible.)

The method 400 then proceeds to block 410 where the BIOS determines that the PPR operations have failed. In an embodiment, at block 410, the performance of the PPR operations at block 408 may result in the BIOS 208 determining that those PPR operations have failed. As discussed above, due to the number of reserved memory locations in the volatile memory system 206 being limited, at some point the PPR resources provided by the reserved memory locations in the volatile memory system 206 will be used up (i.e., once all of those reserved memory locations are used to replace unavailable memory locations) such that there are no reserved memory locations available in the volatile memory system 206 for use in replacing one or more of the unavailable memory location(s). As discussed above, in such situations the PPR operations "fail", and in conventional PPR systems the unavailable memory locations associated with the PPR failure(s) will simply exist in the volatile memory system 206 and must be replaced (e.g., via the replacement of the DIMM 302 that includes the DRAM 302a having the unavailable row) if memory system errors associated with attempt to store data in the unavailable memory locations are to be avoided. As such, at some point in the life of the volatile memory system 206, PPR operations may fail and may be detected by the BIOS 208 at block 410.

Figure 5E:
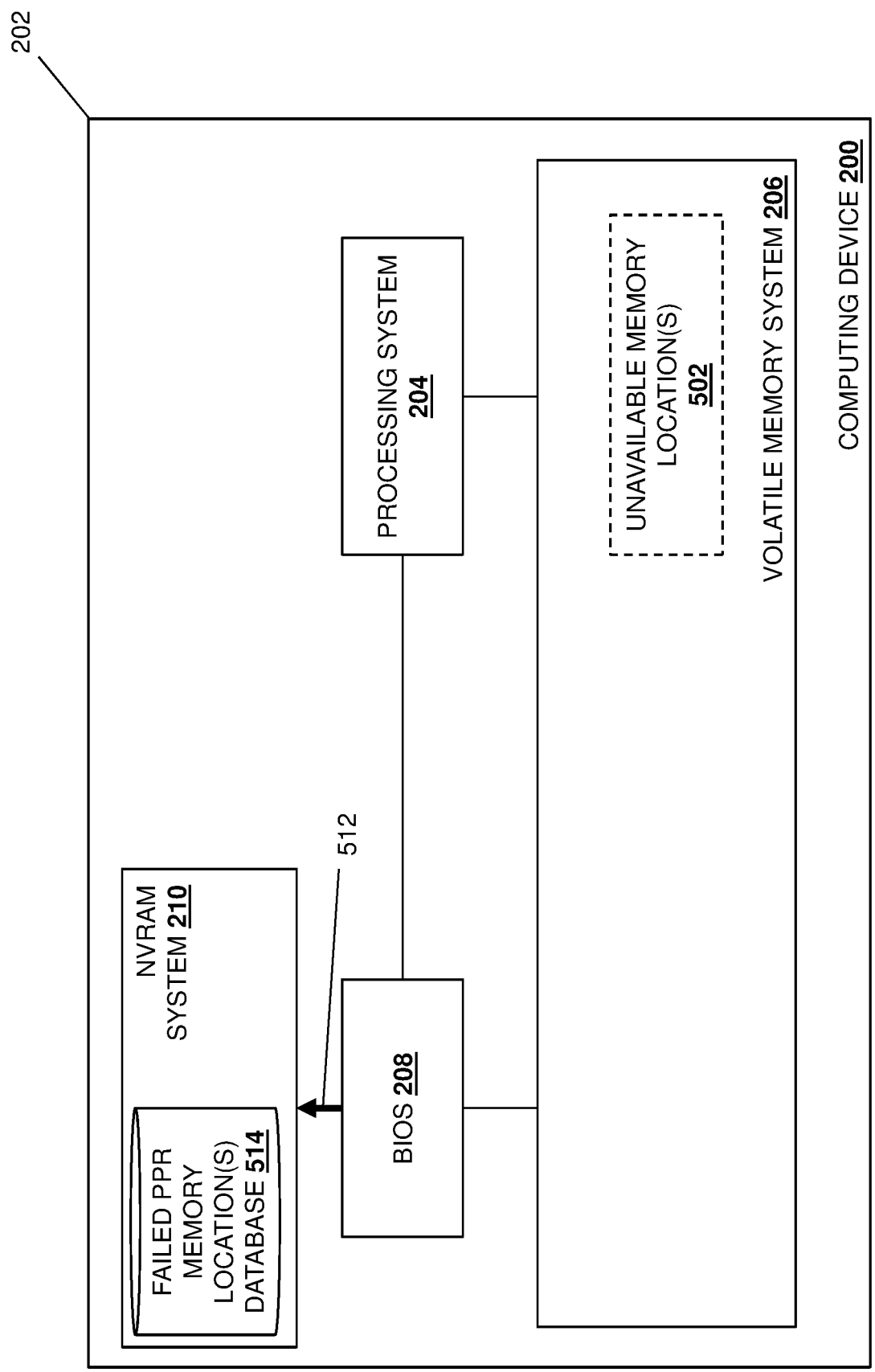
FIG. 5E is a schematic view illustrating an embodiment of the computing device of FIG. 2 operating during the method of FIG. 4.

With reference to FIG. 5E, in an embodiment of block 410 and in response to determine that the PPR operations have failed for at least some of the unavailable memory location(s) 502 in the volatile memory system 206, the BIOS 208 may perform failed PPR memory location storage operations 512 that include storing the memory location identifier(s) for those unavailable memory location(s) 502 in the volatile memory system 206 in a failed PPR memory location(s) database 514 in the NVRAM system 210. For example, the PPR operations may fail for at least one of the unavailable memory location(s) 502 in the volatile memory system 206 (e.g., for the unavailable row in the DRAM 302a included in the DIMM 302) and, in response, the BIOS 208 may store the memory location identifier(s) for those unavailable memory location(s) 502 in the failed PPR memory location(s) database 514 in the NVRAM system 210. However, while the storage in the NVRAM system 210 of the memory location identifier(s) for the unavailable memory location(s) 502 for which the PPR operations were determined to have failed at block 410 is discussed as being performed in a particular location at a particular time, one of skill in the art in possession of the present disclosure will recognize that the storage of memory location identifier(s) for unavailable memory location(s) for which PPR operations have failed may be performed in other locations and/or at other times that will fall within the scope of the present disclosure as well.

Figure 5F:
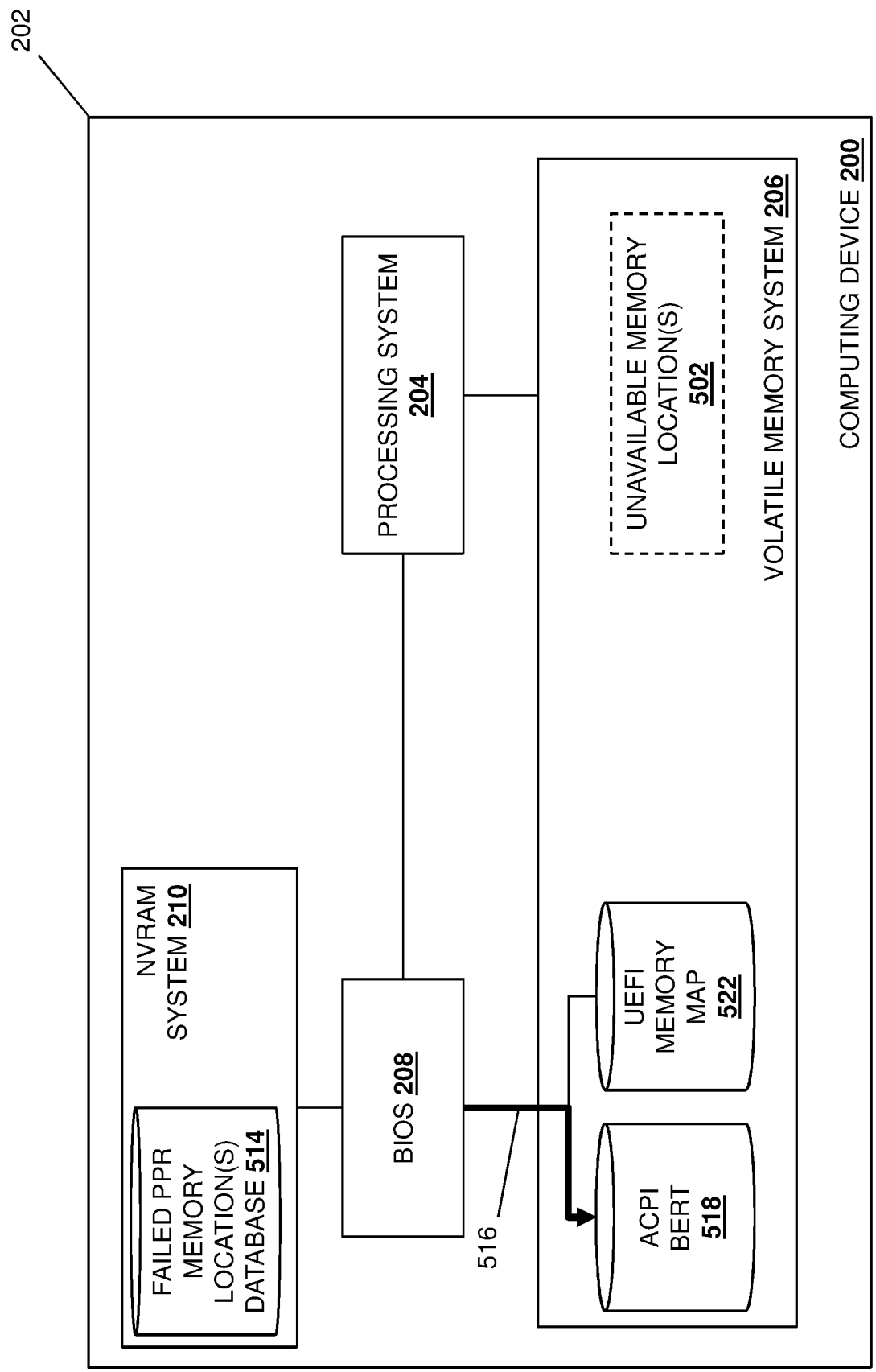
FIG. 5F is a schematic view illustrating an embodiment of the computing device of FIG. 2 operating during the method of FIG. 4.

The method 400 then proceeds to block 412 where the BIOS stores the memory location identifier in a boot error report table. With reference to FIG. 5F, in an embodiment of block 412 and in response to determine that the PPR operations have failed for at least some of the unavailable memory location(s) 502 in the volatile memory system 206, the BIOS 208 may perform boot error report table storage operations 516 that include storing the memory location identifier(s) for those unavailable memory location(s) 502 in a boot error report table that is illustrated in FIG. 5F as being provided by an Advanced Configuration and Power Interface (ACPI) Boot Error Report Table (BERT) 518 that is included in the volatile memory system 206. As will be appreciated by one of skill in the art in possession of the present disclosure, the ACPI BERT is conventionally provided to store and report errors such as, for example, Peripheral Component Interconnect express (PCIe) boot errors (e.g., resulting from a failure for a PCIe device in booting, and causing that PCIe device to be ignored during runtime operations) and/or other boot errors known in the art, and in some embodiments the PPR failure memory location reporting system may leverage the ACPI BERT to report memory locations associated with PPR failures at block 412.

As such, during the boot operations for the computing device 200 that follow the first runtime operations for the computing device 200, the PPR operations may fail for at least one of the unavailable memory location(s) 502 in the volatile memory system 206 (e.g., for the unavailable row in the DRAM 302a included in the DIMM 302) and, in response, the BIOS 208 may store the memory location identifier(s) for those unavailable memory location(s) 502 in the ACPI BERT 518 in the volatile memory system 206. However, while the storage of the memory location identifier(s) for the unavailable memory location(s) 502 for which the PPR operations were determined to have failed at block 410 is discussed as being performed in a particular location and at a particular time, one of skill in the art in possession of the present disclosure will recognize that the storage of memory location identifier(s) for unavailable memory location(s) for which PPR operations have failed may be performed in other locations and/or at other times that will fall within the scope of the present disclosure as well.

Figure 5G:
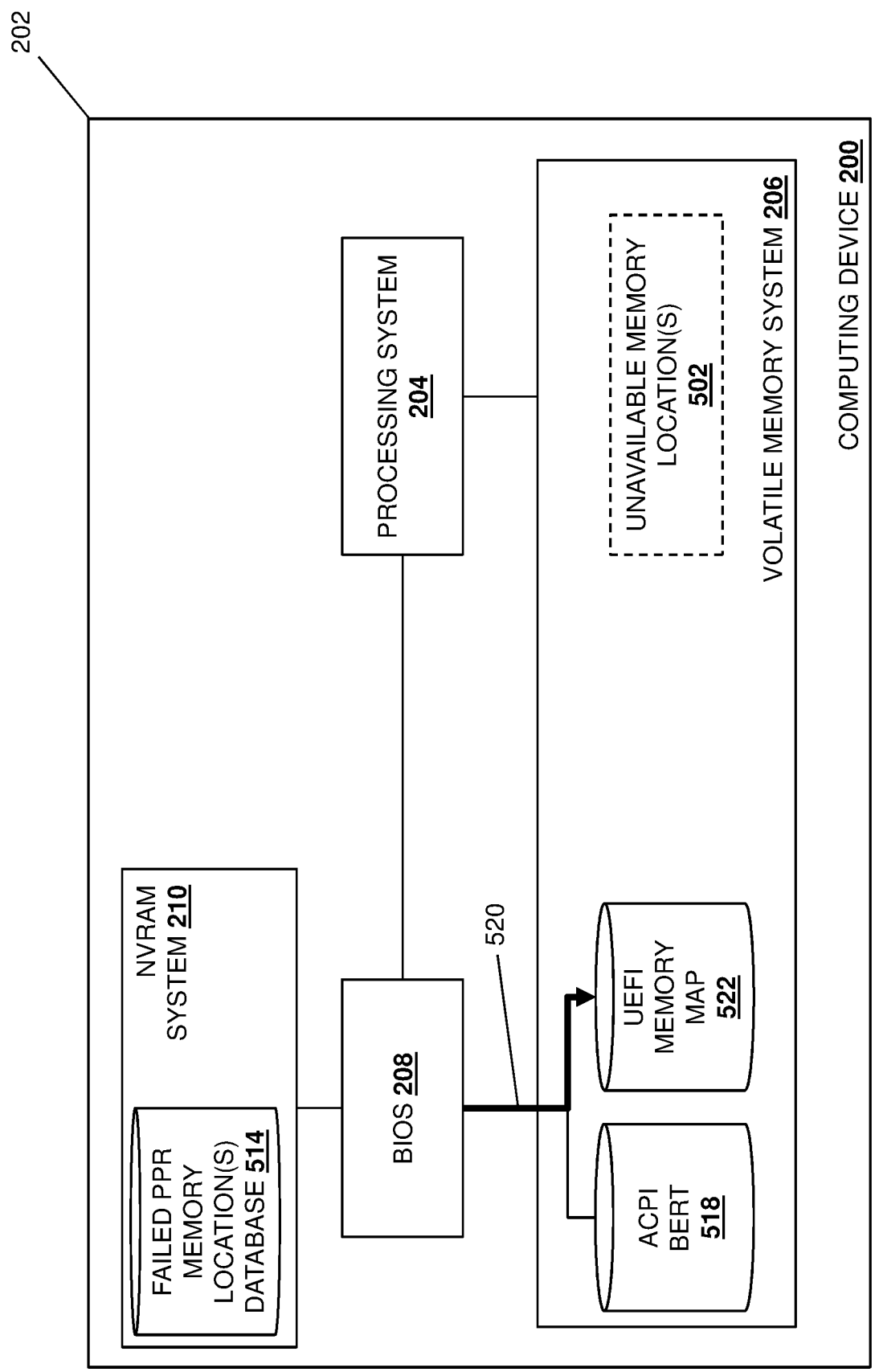
FIG. 5G is a schematic view illustrating an embodiment of the computing device of FIG. 2 operating during the method of FIG. 4.

The method 400 then proceeds to block 414 where the BIOS reserves the memory location identifier in a memory map. With reference to FIG. 5G, in an embodiment of block 414 and in response to determine that the PPR operations have failed for at least some of the unavailable memory location(s) 502 in the volatile memory system 206, the BIOS 208 may perform memory map reserving operations 520 that include storing the memory location identifier(s) for those unavailable memory location(s) 502 in a memory map that is illustrated in FIG. 5G as being provided by an Universally Extensible Firmware Interface (UEFI) memory map 512 that is included in the volatile memory system 206. As will be appreciated by one of skill in the art in possession of the present disclosure, the UEFI memory map is conventionally provided to identify memory locations reserved for use by the BIOS 208/UEFI, and the PPR failure memory location reporting system may leverage the UEFI memory map to report memory locations associated with PPR failures at block 414 by identifying those memory locations as reserved memory locations.

As such, during the boot operations for the computing device 200 that follow the first runtime operations for the computing device 200, the PPR operations may fail for at least one of the unavailable memory location(s) 502 in the volatile memory system 206 (e.g., for the unavailable row in the DRAM 302a included in the DIMM 302) and, in response, the BIOS 208 may store the memory location identifier(s) for those unavailable memory location(s) 502 in the UEFI memory map 522 in the volatile memory system 206. However, while the storage of the memory location identifier(s) for the unavailable memory location(s) 502 for which the PPR operations were determined to have failed at block 410 is discussed as being performed in a particular location and at a particular time, one of skill in the art in possession of the present disclosure will recognize that the storage of memory location identifier(s) for unavailable memory location(s) for which PPR operations have failed may be performed in other locations and/or at other times that will fall within the scope of the present disclosure as well. For example, the BIOS 208 may also report unavailable memory locations as reserved in a legacy E820 table or other operating system interface that one of skill in the art in possession of the present disclosure will recognize will prevent the operating system from accessing those memory locations.

Figure 5H:
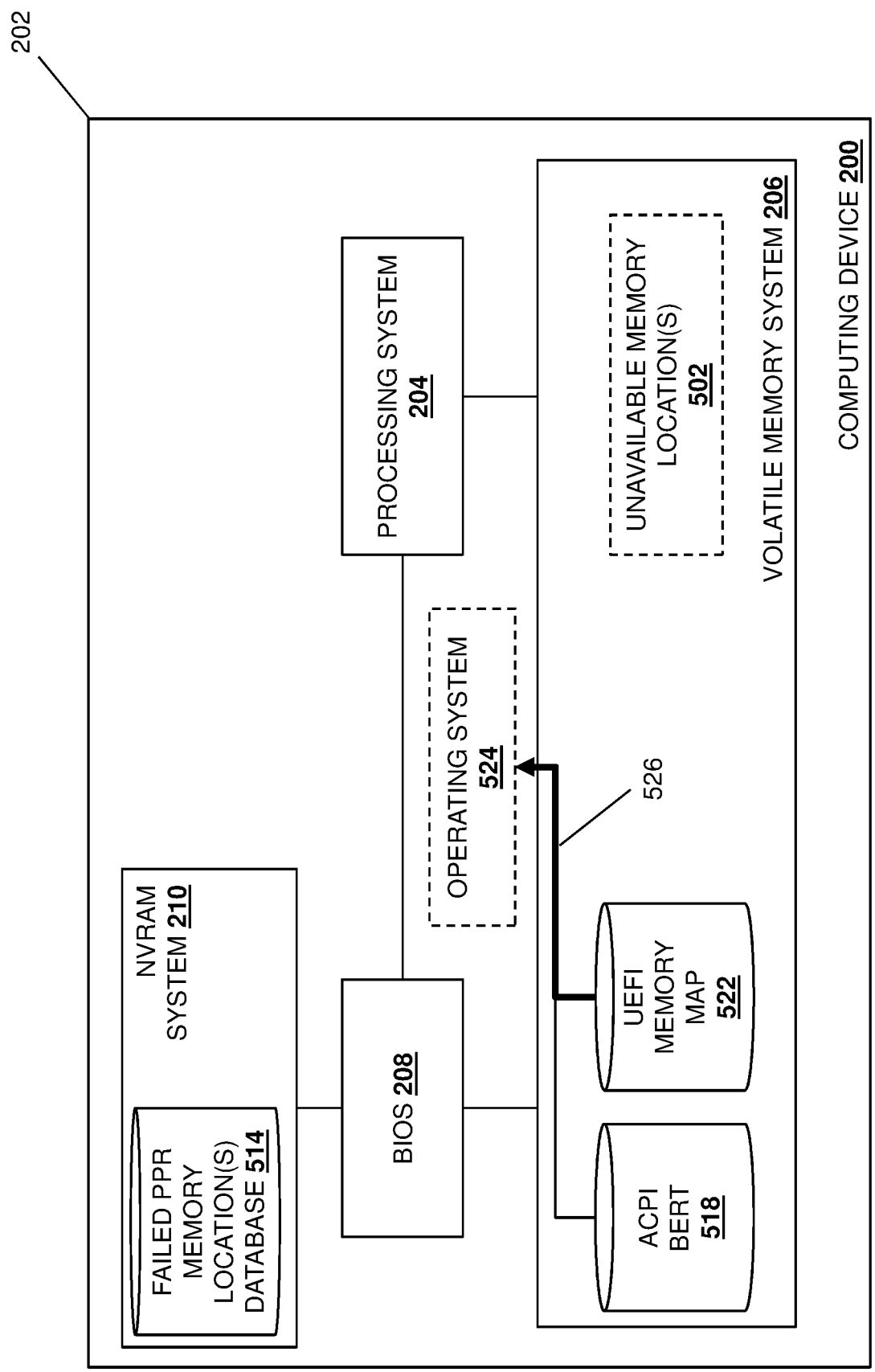
FIG. 5H is a schematic view illustrating an embodiment of the computing device of FIG. 2 operating during the method of FIG. 4.

The method 400 then proceeds to block 416 where an operating system is prevented from storing data in the memory location using the memory map. In an embodiment, following the boot operations for the computing device 200 (which follow the first runtime operations for the computing device 200) discussed above, the computing device 200 may enter a second runtime state in which second runtime operations are performed. As illustrated in FIG. 5H and as discussed above, the boot operations for the computing device 200 may allow the processing system 204 to execute instructions that are stored on the volatile memory system 206 in order to provide an operating system 524 during the second runtime operations for the computing device 200. As such, in an embodiment of block 416, the operating system 524 may operate to perform memory map access operations 526 to access the UEFI memory map 522 (or legacy E820 table or other operating system interface) that, as discussed above, stores the memory location identifier(s) for the unavailable memory location(s) 502 associated with the PPR operation failure during the boot operations for the computing device 200, thus "reserving" those unavailable memory location(s) 502 in the UEFI memory map 522. As will be appreciated by one of skill in the art in possession of the present disclosure, the operating system 524 will not attempt to utilize (e.g., store data in) memory locations that are "reserved" via the UEFI memory map 522 (i.e., that are reserved for use by the BIOS 208/UEFI), and thus the storage of memory location identifier(s) for the unavailable memory location(s) 502 associated with the PPR operation failure during the boot operations for the computing device 200 in the UEFI memory map 522 operates to prevent the operating system from storing data in those unavailable memory location(s) 502 during the second runtime operations for the computing device 200.

In some examples, the operating system 524 may operate, during a time in which the ACPI for the computing device 200 has not yet been loaded and thus the ACPI BERT 518 is unavailable, to access the UEFI memory map 522 when loading operating system kernel code on the non-volatile memory system 206 in order to prevent the use of memory locations that are "reserved" or otherwise utilized by the BIOS/UEFI 208 for that operating system kernel code. As such, during the time in which the ACPI for the computing device 200 has not yet been loaded and thus the ACPI BERT 518 is unavailable, the storage of memory location identifier(s) for the unavailable memory location(s) 502 associated with the PPR operation failure during the boot operations for the computing device 200 in the UEFI memory map 522 operates to prevent the operating system from storing data in those unavailable memory location(s) 502 during the portion of the second runtime operations for the computing device 200 in which the ACPI BERT 518 is unavailable. However, while a particular reasoning of the use of the UEFI memory map 522 is described above, one of skill in the art in possession of the present disclosure will recognize that the UEFI memory may 522 may be utilized for other reasons that will fall within the scope of the present disclosure as well.

Figure 5I:
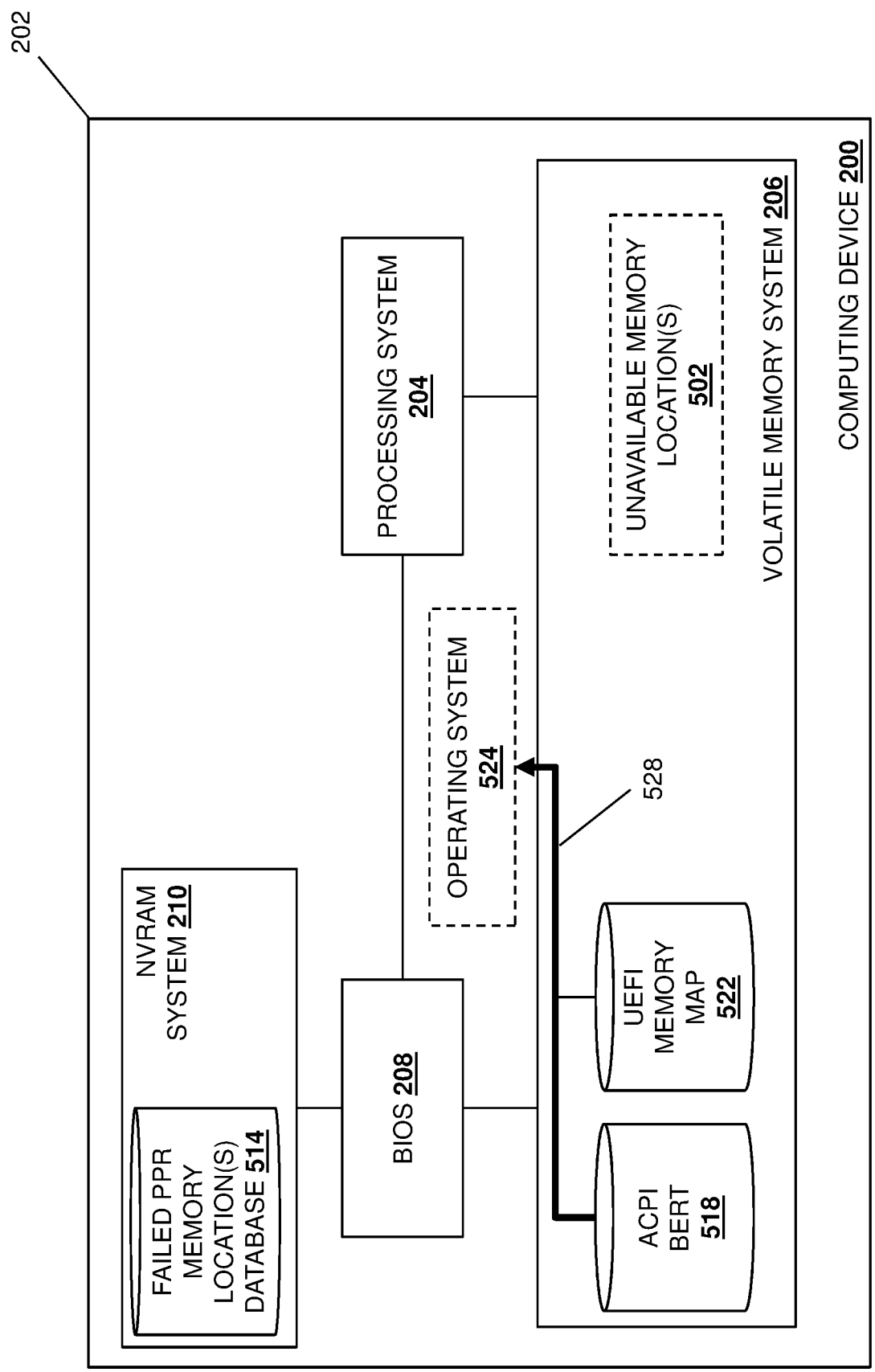
FIG. 5I is a schematic view illustrating an embodiment of the computing device of FIG. 2 operating during the method of FIG. 4.

The method 400 then proceeds to block 418 where the operating system is prevented from storing data in the memory location using the boot error report table. As discussed above, following the boot operations for the computing device 200 (which follow the first runtime operations for the computing device 200) discussed above, the computing device 200 may enter the second runtime state in which second runtime operations are performed. As illustrated in FIG. 5I and as discussed above, the boot operations for the computing device 200 may allow the processing system 204 to execute instructions that are stored on the volatile memory system 206 in order to provide the operating system 524 during the second runtime operations for the computing device 200. As such, in an embodiment of block 418, the operating system 524 may operate to perform boot error report table access operations 528 to access the ACPI BERT 518 that, as discussed above, stores the memory location identifier(s) for the unavailable memory location(s) 502 associated with the PPR operation failure during the boot operations for the computing device 200. As will be appreciated by one of skill in the art in possession of the present disclosure, the operating system 524 will not attempt to utilize (e.g., store data in) memory locations that are identified in the ACPI BERT 518, and thus the storage of memory location identifier(s) for the unavailable memory location(s) 502 associated with the PPR operation failure during the boot operations for the computing device 200 in the ACPI BERT 518 operates to prevent the operating system from storing data in those unavailable memory location(s) 502 during the second runtime operations for the computing device 200.

As discussed above, the operating system 524 may operate, following the loading of the ACPI for the computing device 200 and the availability of the ACPI BERT 518, to access the ACPI BERT 518 in order to prevent the storage of data on memory locations identified in the ACPI BERT 518. As such, once the ACPI for the computing device 200 has been loaded and thus the ACPI BERT 518 is available, the storage of memory location identifier(s) for the unavailable memory location(s) 502 associated with the PPR operation failure during the boot operations for the computing device 200 in the ACPI BERT 518 operates to prevent the operating system from storing data in those unavailable memory location(s) 502 during the portion of second runtime operations for the computing device 200 in which the ACPI BERT 518 is available. However, while a particular reasoning of the use of the ACPI BERT 518 is described above, one of skill in the art in possession of the present disclosure will recognize that the ACPI BERT 518 may be utilized for other reasons that will fall within the scope of the present disclosure as well.

As discussed above, the memory location identifier(s) for the unavailable memory location(s) 502 associated with the PPR operation failure during the boot operations for the computing device 200 may be stored in the failed PPR memory location(s) database 514 in the NVRAM system 210. Furthermore, the failed PPR memory location(s) database 514 in the NVRAM system 210 may associate a memory module identifier for a memory module (e.g., a DIMM serial number for a DIMM) with a memory location identifier for an unavailable memory location (e.g., a rank identifier, row identifier, column identifier, bank identifier, DRAM identifier, etc., for a DRAM in the DIMM). As will be appreciated by one of skill in the art in possession of the present disclosure, the storage of the memory location identifier for an unavailable memory location along with a memory module identifier for a memory module that includes that memory location allows unavailable memory location(s) to be identified even if the memory module is disconnected from a first memory module connecter and connected to a second memory module connector (e.g., when the DIMM is disconnected from a first DIMM slot and connected to a second DIMM slot.)

For example, in the event the DIMM 302 with the DRAM 302a having an unavailable row is disconnected from a first DIMM slot in the computing device 200 and connected to a second DIMM slot in the computing device 200, the BIOS 208 may operate to identify the DIMM 302 connected to the second DIMM slot via the DIMM serial number that is stored in the failed PPR memory location(s) database 514 in the NVRAM system 210 and in association with the memory location identifier for the unavailable row in the DRAM 302a. The BIOS 208 may then translate that unavailable row so that it may be identified based on the new location of the DIMM 302 in the second DIMM slot, and identify the translated unavailable row via the boot error report table and memory map, which operates to prevent the operating system from storing data in that translated unavailable row in substantially the same manner described above. In some embodiments, the BIOS 208 may, during subsequent boot operations following the performance of PPR operations, retrieve unavailable memory locations from the NVRAM system 210 and report those unavailable memory locations to the operating system (e.g., via the ACPI BERT, UEFI memory map, legacy E820 table, or other operating system interface) without performing PPR operations during those subsequent boot operations.

Thus, systems and methods have been described that provide for the reporting of memory locations associated with a PPR failure in an ACPI BERT and a UEFI memory map such that an operating system is prevented from storing data in those memory locations associated with the PPR failure. For example, the PPR memory location reporting system of the present disclosure may include a BIOS that is coupled to a NVRAM system and a volatile memory system, with the BIOS operating to identify a memory location identifier in the NVRAM system for a memory location that is included in the volatile memory system and that is associated with PPR and, in response, perform PPR operations on the memory location. In the event the BIOS determines that the PPR operations on the memory location have failed, the BIOS stores the memory location identifier in an ACPI BERT that prevents use of the memory location by the operating system, and reserves the memory location identifier in a UEFI memory map that prevents use of the memory location by the operating system. As such, unavailable memory locations that cannot be repaired via PPR will not be utilized by the operating system to store data, thus reducing the memory errors experienced in a memory system that has exhausted its PPR resources.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Post Package Repair (PPR) memory location reporting system, comprising:
   a non-volatile memory system;
   a volatile memory system; and
   a Basic Input/Output System (BIOS) that is coupled to the non-volatile memory system and the volatile memory system and that is provided by a hardware processor that is included on a BIOS processing system, wherein the BIOS is configured, during boot operations, to:
      identify, in the non-volatile memory system, a memory location identifier for a memory location that is included in the volatile memory system and that is associated with Post Package Repair (PPR);
      perform, in response to identifying that the memory location identifier is associated with PPR, PPR operations on the memory location;
      determine that the PPR operations on the memory location have failed;
      store, in a boot error report table in response to determining that the PPR operations on the memory location have failed, the memory location identifier, wherein the boot error report table is configured for use by an operating system to prevent use of the memory location by the operating system; and
      reserve, in a memory map in response to determining that the PPR operations on the memory location have failed, the memory location identifier, wherein the memory map is configured for use by the operating system to prevent use of the memory location by the operating system before the boot error report table is available.

2. The system of claim 1, further comprising:
   a processing system that is coupled to the volatile memory system and the BIOS, wherein the BIOS is configured, during runtime operations, to
      receive, from the processing system, the memory location identifier; and
      associate the memory location identifier with the PPR in the non-volatile memory system.

3. The system of claim 1, wherein the BIOS is configured, during runtime operations, to:
   associate, in the non-volatile memory system in response to determining that the PPR operations on the memory location have failed, the memory location identifier with failed PPR operations.

4. The system of claim 1, wherein the BIOS is configured, during boot operations, to:
   associate, in the non-volatile memory system in response to determining that the PPR operations on the memory location have failed, the memory location identifier that is associated with the failed PPR operations with a memory module identifier for a memory module that is connected to a first memory module connector and that includes a memory device having the memory location.

5. The system of claim 4, wherein the BIOS is configured to:
   detect, using the memory module identifier associated in the non-volatile memory system with the memory location identifier that is associated with the failed PPR operations, the memory module that is connected to a second memory module connector that is different than the first memory module connector.

6. The system of claim 1, wherein the boot error report table is an Advanced Configuration and Power Interface (ACPI) Boot Error Report Table (BERT), and wherein the memory map is a Universally Extensible Firmware Interface (UEFI) memory map.

7. An Information Handling System (IHS), comprising:
   a Basic Input/Output System (BIOS) processing system that includes at least one hardware processor; and
   a BIOS memory system that includes a non-transitory memory that is coupled to the BIOS processing system and that includes instructions that, when executed by the at least one hardware processor, cause the BIOS processing system to provide a BIOS engine that is configured, during boot operations, to:
      identify, in a non-volatile memory system, a memory location identifier for a memory location that is included in a volatile memory system and that is associated with Post Package Repair (PPR);
      perform, in response to identifying that the memory location identifier is associated with PPR, PPR operations on the memory location;
      determine that the PPR operations on the memory location have failed;
      store, in a boot error report table in response to determining that the PPR operations on the memory location have failed, the memory location identifier, wherein the boot error report table is configured for use by an operating system to prevent use of the memory location by the operating system; and
      reserve, in a memory map in response to determining that the PPR operations on the memory location have failed, the memory location identifier, wherein the memory map is configured for use by the operating system to prevent use of the memory location by the operating system before the boot error report table is available.

8. The IHS of claim 7, wherein the BIOS engine is configured, during runtime operations, to:
   receive, from a primary processing system, the memory location identifier; and
   associate the memory location identifier with the PPR in the non-volatile memory system.

9. The IHS of claim 7, wherein the BIOS engine is configured, during runtime operations, to:
   associate, in the non-volatile memory system in response to determining that the PPR operations on the memory location have failed, the memory location identifier with failed PPR operations.

10. The IHS of claim 7, wherein the BIOS engine is configured, during boot operations, to:
   associate, in the non-volatile memory system in response to determining that the PPR operations on the memory location have failed, the memory location identifier that is associated with the failed PPR operations with a memory module identifier for a memory module that is connected to a first memory module connector and that includes a memory device having the memory location.

11. The IHS of claim 10, wherein the BIOS engine is configured to:
   detect, using the memory module identifier associated in the non-volatile memory system with the memory location identifier that is associated with the failed PPR operations, the memory module that is connected to a second memory module connector that is different than the first memory module connector.

12. The IHS of claim 7, wherein the boot error report table is an Advanced Configuration and Power Interface (ACPI) Boot Error Report Table (BERT).

13. The IHS of claim 7, wherein the memory map is a Universally Extensible Firmware Interface (UEFI) memory map.

14. A method for reporting Post Package Repair (PPR) failure memory locations, comprising:
   identifying, by a Basic Input/Output System (BIOS) in a non-volatile memory system, a memory location identifier for a memory location that is included in a volatile memory system and that is associated with Post Package Repair (PPR);
   performing, by the BIOS in response to identifying that the memory location identifier is associated with PPR, PPR operations on the memory location;
   determining, by the BIOS, that the PPR operations on the memory location have failed;
   storing, by the BIOS in a boot error report table in response to determining that the PPR operations on the memory location have failed, the memory location identifier, wherein the boot error report table is configured for use by an operating system to prevent use of the memory location by the operating system; and
   reserving, by the BIOS in a memory map in response to determining that the PPR operations on the memory location have failed, the memory location identifier, wherein the memory map is configured for use by the operating system to prevent use of the memory location by the operating system before the boot error report table is available.

15. The method of claim 14, further comprising:
   receiving, by the BIOS from a primary processing system, the memory location identifier; and
   associating, by the BIOS, the memory location identifier with the PPR in the non-volatile memory system.

16. The method of claim 14, further comprising:
   associating, by the BIOS in the non-volatile memory system in response to determining that the PPR operations on the memory location have failed, the memory location identifier with failed PPR operations.

17. The method of claim 14, further comprising:
   associating, by the BIOS in the non-volatile memory system in response to determining that the PPR operations on the memory location have failed, the memory location identifier that is associated with the failed PPR operations with a memory module identifier for a memory module that is connected to a first memory module connector and that includes a memory device having the memory location.

18. The method of claim 14, further comprising:
   detecting, by the BIOS using the memory module identifier associated in the non-volatile memory system with the memory location identifier that is associated with the failed PPR operations, the memory module that is connected to a second memory module connector that is different than the first memory module connector.

19. The method of claim 14, wherein the boot error report table is an Advanced Configuration and Power Interface (ACPI) Boot Error Report Table (BERT).

20. The method of claim 14, wherein the memory map is a Universally Extensible Firmware Interface (UEFI) memory map.

* * * * *